Figure 1:
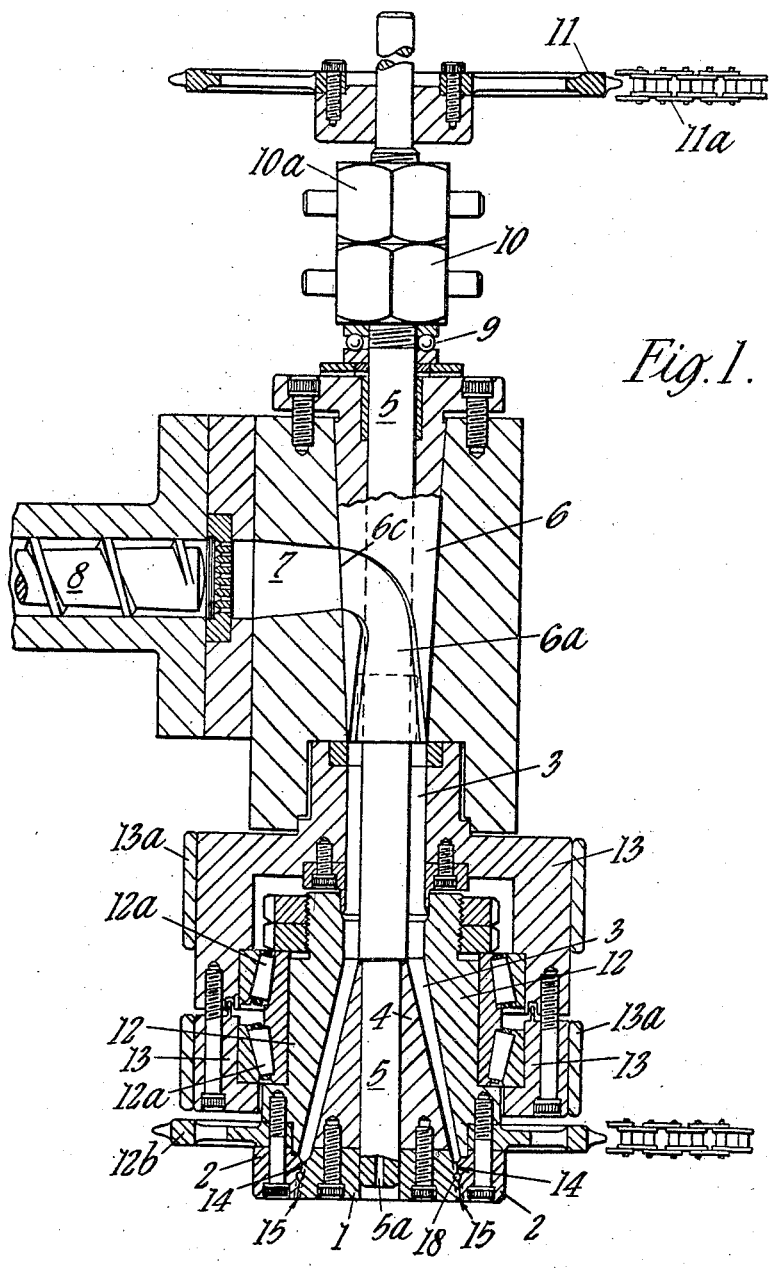

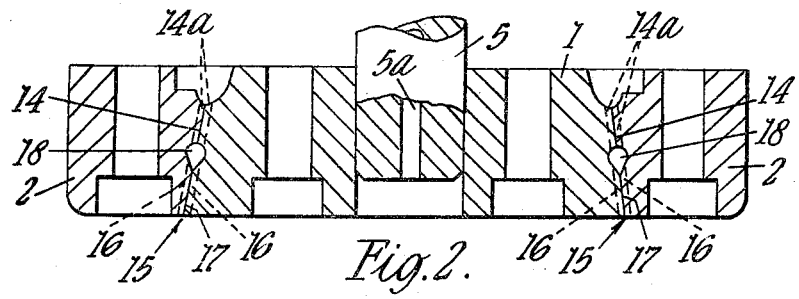
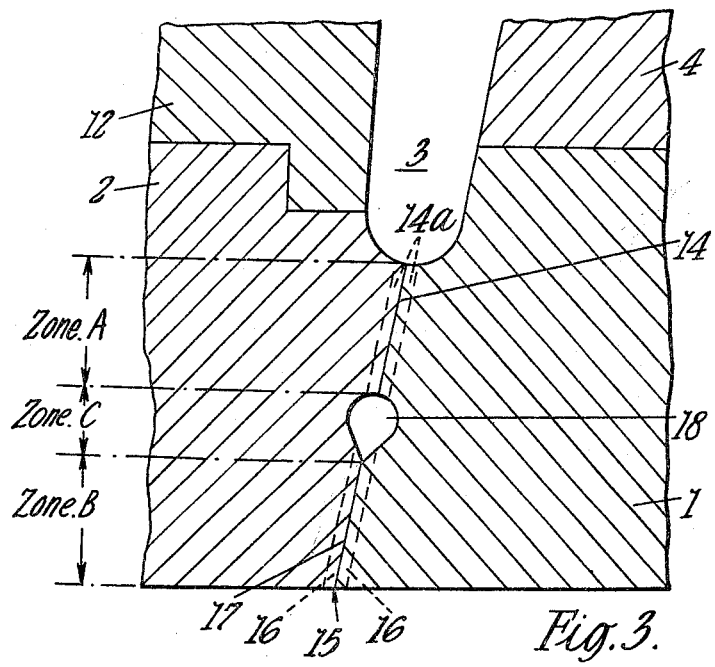
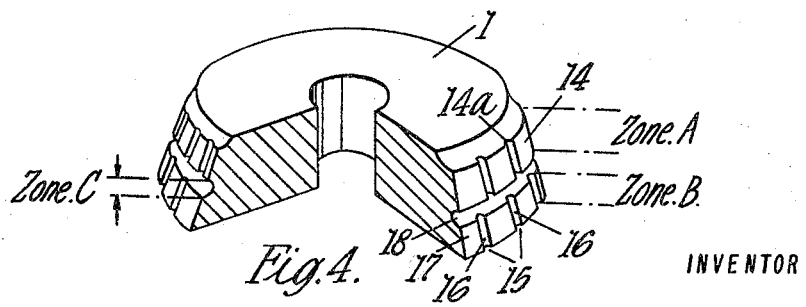

Jan. 1, 1963  F. B. MERCER  3,070,840
EXTRUSION OF PLASTIC SHEETING OR NETTING
Filed March 25, 1960  8 Sheets-Sheet 4

INVENTOR
FRANK BRIAN MERCER

BY *Francis H. Deef*
ATTORNEY

Jan. 1, 1963  F. B. MERCER  3,070,840
EXTRUSION OF PLASTIC SHEETING OR NETTING
Filed March 25, 1960  8 Sheets-Sheet 5

INVENTOR
FRANK BRIAN MERCER

BY Francis H. Dee
ATTORNEY

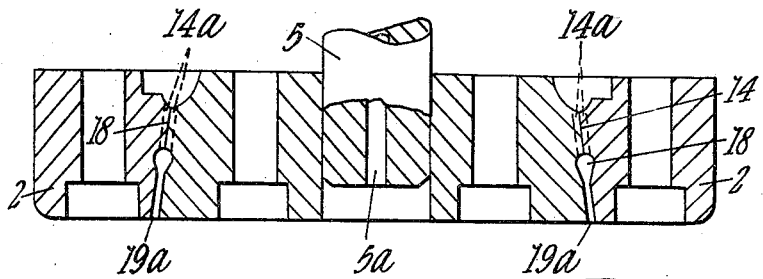
Fig. 9.
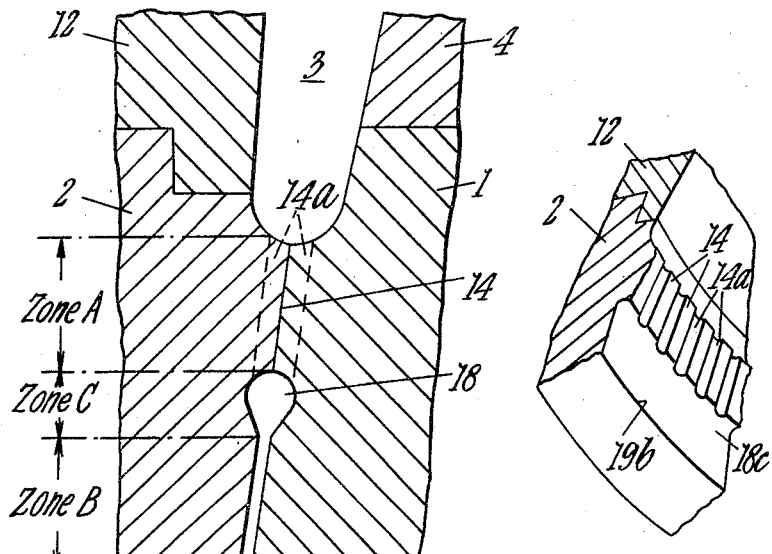
Fig. 10.
Fig. 13.
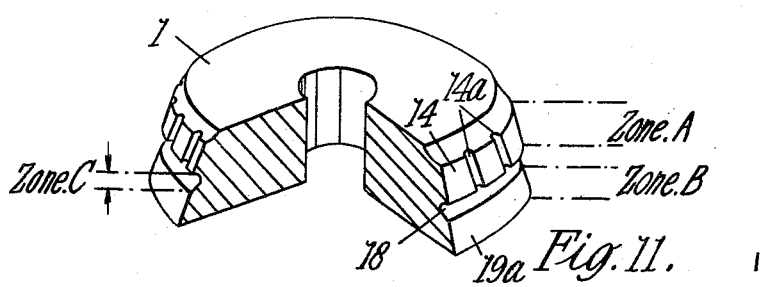
Fig. 11.
INVENTOR
FRANK BRIAN MERCER
BY Francis H. Deef
ATTORNEY Jan. 1, 1963  F. B. MERCER  3,070,840
EXTRUSION OF PLASTIC SHEETING OR NETTING
Filed March 25, 1960  8 Sheets-Sheet 8

INVENTOR
FRANK BRIAN MERCER

BY *Francis H. Dee*
ATTORNEY

United States Patent Office 3,070,840
Patented Jan. 1, 1963

3,070,840
EXTRUSION OF PLASTIC SHEETING OR NETTING
Frank Brian Mercer, Blackburn, England, assignor to Plastic Textile Accessories Limited, Blackburn, England
Filed Mar. 25, 1960, Ser. No. 17,654
7 Claims. (Cl. 18—12)

This invention relates to the extrusion of plastic netting or sheeting in tubular or cylindrical form by methods and apparatus of the character described in our British patent specifications Nos. 836,555 and 29,946/58.

According to the above applications, netting or sheeting is extruded through circumferentially extending die means formed between a pair of extrusion members or dies (hereinafter referred to as die members) having coaxial surfaces adjacent the die means and in sliding contact with one another to form a bearing slideway, one or both of the die members being given continuous rotary or oscillatory motion. The die means are supplied with plastic from a pressure supply chamber through feed ducts, which may be formed in one or both of the contacting co-axial surfaces of the die members and which communicate with the chamber and with the die means.

The die means may take three basic forms, viz., die means to produce net or netting in the manner described in the above mentioned patent specification No. 836,555; die means to produce a tubular or cylindrical sheet having integral projecting ribs on one or both sides of the sheet in the manner described in the above mentioned patent specification No. 29,946/58; and die means to produce a tubular or cylindrical plain sheet.

To these ends, the die means for producing net or netting comprise in each die member a plurality of circumferentially spaced die discharge orifices, such that when the die orifices in one die member are opposite, or in register with, the die orifices in the other member net intersections are extruded and, on moving out of register, the two sets of die orifices extrude separate net strands which are recombined into net intersections on the next registration of the die orifice sets. For the production of sheeting having integral ribs thereon, the die means include an annular slot disposed between the die members in the zone of the die means and the sides of the sheeting slot are provided with rib or strand-extruding dies, the discharge orifices of which open into the slot, for example, for producing sheeting having ribs or strands in crossing relation on opposite sides thereof integral with the sheeting.

For the production of plain sheeting, the die means comprise an annular slot disposed between the die members in the zone of the die means, similar to that mentioned immediately above but without ribs or strand-extruding dies associated with the sides of the slot.

In the case of the latter two forms, viz., the ribbed sheeting and the plain sheeting, the relative motion of the sides of the slot has a smearing action on the plastic extruded therethrough which serves to produce a more uniform product, both as regards thickness and even distribution of the plastic.

The aim of the present invention is twofold—on the one hand, to ensure an ample supply and uniform distribution of the plastic to the die means and on the other hand, to provide an enhanced mixing and smearing action on the plastic before entering the die means.

Optimum extrusion pressures vary according to the characteristics of the plastic under treatment, the temperature thereof and the cross-sectional area of the die means, slot gap dimension and, in the case of the netting and ribbed sheeting, the number of strand- or rib-forming dies, the finer dies requiring greater pressure than the coarser ones. Where the higher pressures are required, greater pressure on the slideway surfaces will be necessary to effect the sealing thereof, and consequently the rate of wear thereon may be increased to an undesirable extent. Merely to meet this difficulty by augmenting the bearing surface by increasing the axial extent of the die members is unsatisfactory as this would correspondingly increase the length of the slot and/or strand-forming die means and accordingly extend the distance between the die discharge orifices or slot orifice and the source of supply of plastic in a state of satisfactory consistency for extrusion, and this would be more particularly undesirable where, in the case of netting or ribbed sheeting, the finer gauges of dies are employed, for example where such are of the order of .010 of an inch or 0.25 mm. in diameter or cross-sectional dimension.

A further aim of the invention is therefore to increase the bearing area of the contacting, co-axial, slideway surfaces of the die members by increasing their axial extent without correspondingly increasing the distance between the die discharge orifices or slot orifice and the supply source of properly conditioned plastic therefor.

Accordingly, the present invention consists in, in apparatus for extruding plastic netting or sheeting in tubular or cylindrical form through co-axial, circular, relatively rotating, die members having circular contacting surfaces forming a slideway and circumferentially extending die means fed with plastic under pressure from an extrusion supply chamber through feed ducts formed in said slideway, the provision of an annular passage or groove in a zone at right angles to the axis of the co-axial die members and between the slideway contacting surfaces and said circumferentially extending die means, which groove or passage acts as an intermediate annular reservoir for the plastic fed through the feed ducts from the supply chamber and, by reason of the friction of the walls of the annular reservoir through rotation of the die members, the plastic in said reservoir is kept in circulating or turbulent and smearing motion.

Thus, the die members are divided, in effect, into three axially spaced zones, extending in planes at right angles to the axis of the die members, the first zone, zone A, comprising the contacting slideway surfaces of the die members through which pass feed ducts for the supply of plastic, the second zone, zone B, comprising the extrusion die means, viz., separate strand-forming dies for netting, an annular slot and separate rib-forming dies on one or both of the slot surfaces for ribbed sheeting, or a plain annular slot for plain sheeting, and the third zone, zone C, comprising the annular passage or groove forming the reservoir intermediate the feed ducts in zone A and the die means in zone B.

In apparatus for producing netting or ribbed sheeting, the feed ducts through the slideway zone (zone A) on one side of the annular reservoir zone (zone C) are staggered or out of alignment with respect to the net strand- or rib-forming dies in zone B, so that there is no direct throughway (i.e. aligned) communication between the strand- or rib-dies in zone B and the main plastic supply chamber from which the feed ducts in zone A lead.

The sum of the cross-sectional area of the feed ducts in zone A is equal to or somewhat exceeds the sum of the cross-sectional areas of the die means in zone B, i.e. the net strand-forming dies, or the sheeting slot and its ribbing dies or the plain sheeting slot (as the case may be) so that there is no deficiency in the plastic supply for the die means and this ample supply is kept in motion in the annular reservoir in zone C immediately adjacent to the entry to the die means of zone B.

The provision of the annular groove or passageway in zone C to act as an intermediate reservoir immediately adjacent the commencement of the die means in zone B achieves the following:

(1) An ample supply of plastic to the die means in zone B, since it permits the formation of feed ducts, through the slideway of zone A, having a cross-section considerably in excess of that possible in the case where the feed ducts communicate direct with the die means.

(2) Conditioning or re-conditioning, of the plastic immediately prior to extrusion by the mixing and smearing action on the plastic by the walls of the annular reservoir.

(3) Even distribution of the plastic to the die means around the entire circumferential extent thereof.

(4) In the case of the extrusion of net, slideway bearing surfaces of increased axial extent between the die members at two spaced levels or zones, zones A and B, while maintaining a properly or adequately short axial distance between the die orifices and a supply of properly conditioned plastic, i.e. the plastic in the annular reservoir of zone C.

The extrusion or supply chamber for the plastic and means for pressurising and heating it, as well as the general character of the co-axial members, the mounting therefor and the means for rotating or oscillating either or both members, may be similar to that described in the above mentioned patent specifications.

Figure 3A:
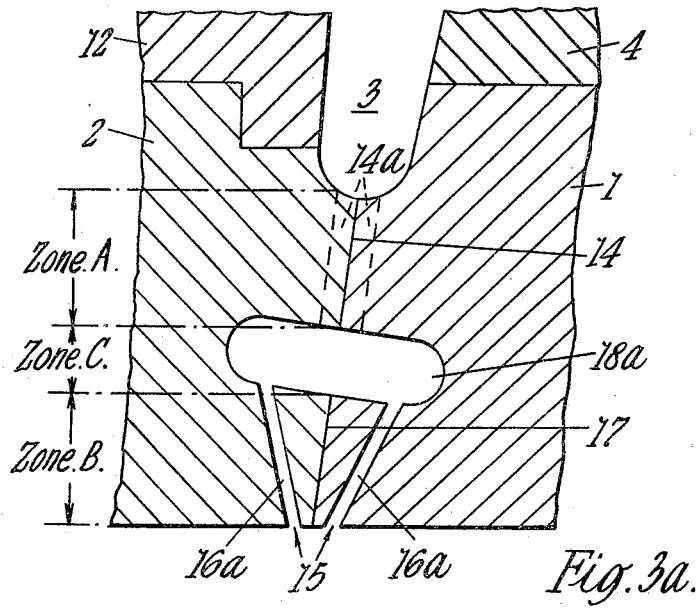
Figure 3B:
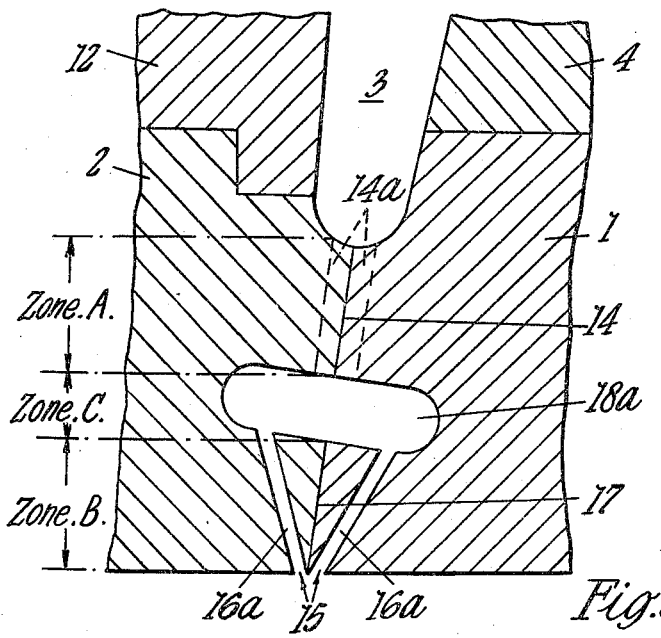
Figure 5:
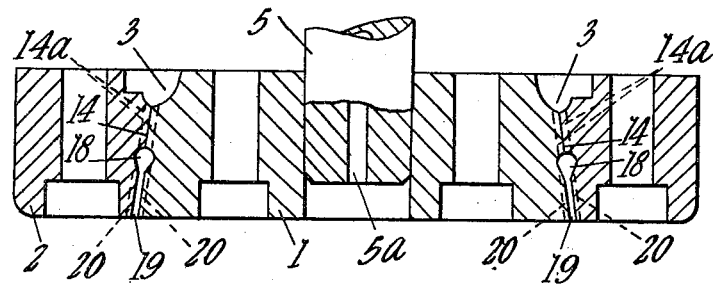
Figure 6:
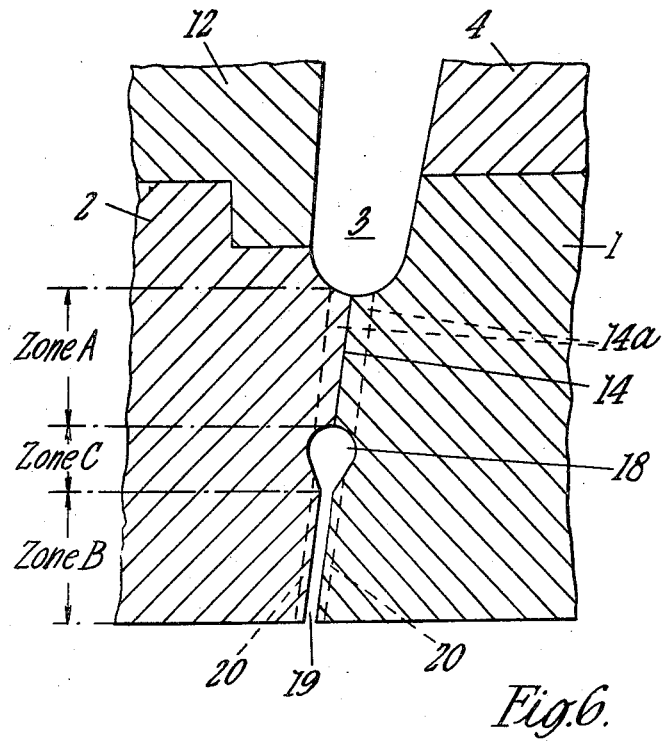
Figure 6A:
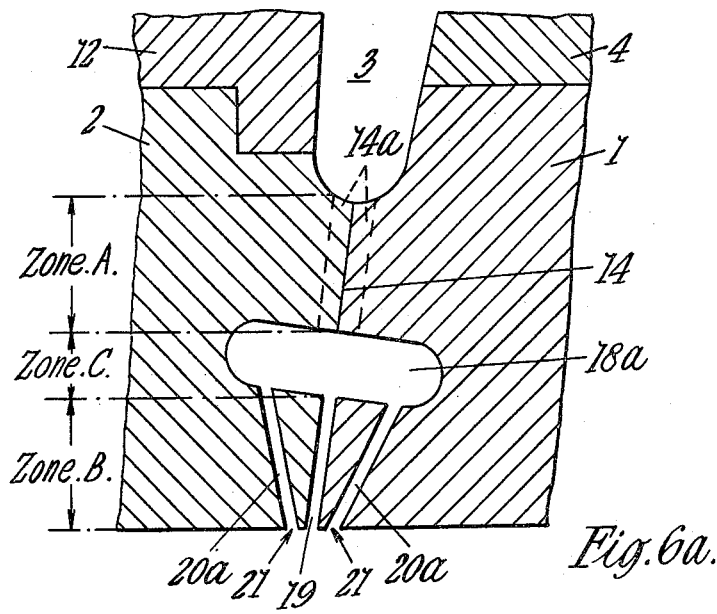
Figure 6B:
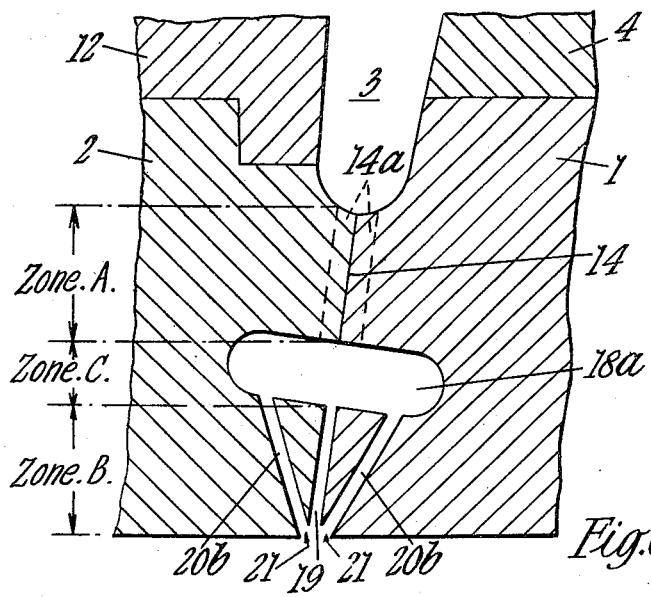
Figure 7:
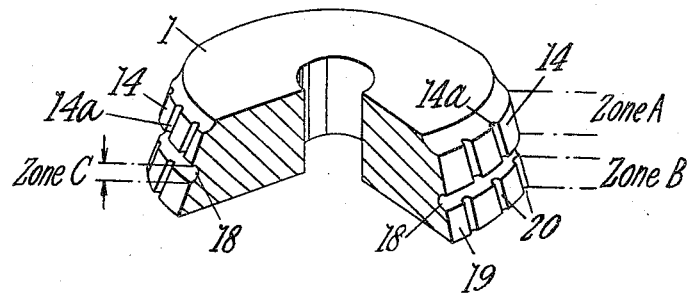
Figure 8:
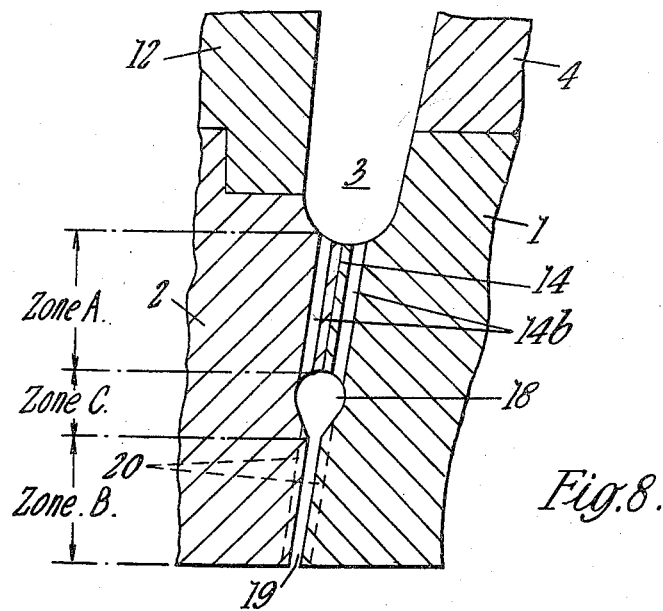

In the accompanying drawings:

FIGURE 1 is a sectional elevation of plastic extrusion apparatus of suitable form for supplying plastic under pressure to rotary die-carrying members according to the invention and shown in position in the lower part of the figure, FIGURE 2 is a cross section on an enlarged scale of the die members shown generally in FIGURE 1 and for the extrusion of netting, showing the feed ducts and the net-forming dies and the annular reservoir, according to the present invention, therebetween, FIGURE 3 is a cross section on a still more enlarged scale of the die means of the die members of FIGURE 2, FIGURE 3a is a cross-section similar to FIGURE 3 showing an alternative form of the net-forming dies, FIGURE 3b is a cross-section similar to FIGURES 3 and 3a showing a further alternative form of the net forming dies, FIGURE 4 is a perspective view, partly in section, of the inner die member, showing the feed ducts, annular reservoir, and net-forming dies, FIGURE 5 is a cross-section similar to FIGURE 2 but for the extrusion of ribbed sheeting, showing the feed ducts and the sheeting slot and ribbing dies with the annular reservoir inbetween, FIGURE 6 is a cross-section on an enlarged scale of the die means of the die-members shown in FIGURE 5, FIGURE 6a is a cross-section similar to FIGURE 6 showing an alternative form of the die means, FIGURE 6b is a cross-section similar to FIGURES 6 and 6a showing a further alternative form of the die means, FIGURE 7 is a perspective view, partly in section, of the inner die member, showing the feed ducts, annular reservoir, sheeting slot and associated ribbing dies, FIGURE 8 is a cross-section on the same scale as FIGURE 6 showing a similar view of the die means but with an alternative form of the feed ducts, FIGURE 9 is a cross-section similar to FIGURES 2 and 5 but for the extrusion of plain sheeting, showing the feed ducts and the sheeting slot with the annular reservoir inbetween.

Figure 12:
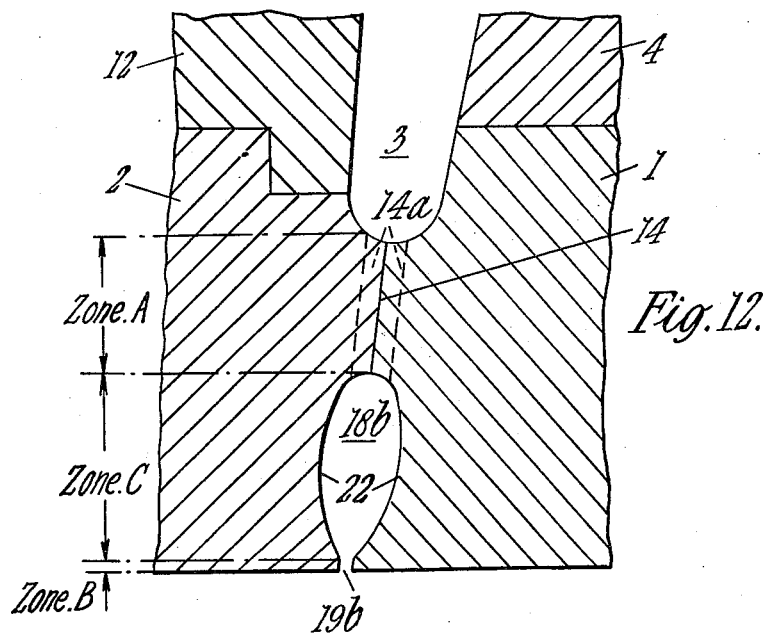
Figure 14:
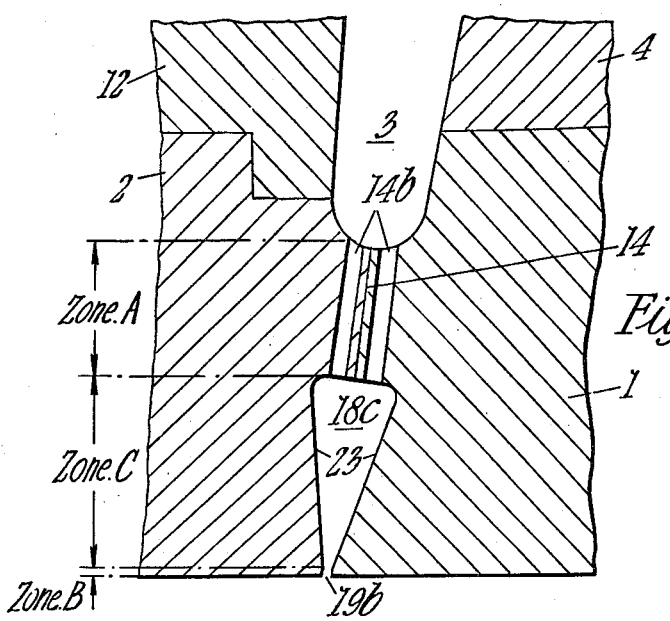

FIGURE 10 is a cross-section on an enlarged scale of the die means of the die members shown in FIGURE 9, FIGURE 11 is a perspective view, partly in section, of the inner die member, showing the feed ducts, annular reservoir and the sheeting slot;

FIGURE 12 is a cross-section on the same scale as FIGURE 10 showing a similar view of the die means but with an alternative form of annular reservoir and sheeting slot, FIGURE 13 is a perspective fragmentary view, partly in section, of the outer die member of FIGURE 12, showing the feed ducts, the annular reservoir and the sheeting slot, and FIGURE 14 is a cross-section on the same scale as FIGURES 10 and 12, showing a similar view of the die means but with a further alternative form of the annular reservoir and an alternative form of the feed ducts.

In carrying the invention into effect according to the preferred mode employing die means which are to be moved in continuous circular paths at right angles to the axis of the circle, a pair of co-axial die-carrying members 1 and 2 are mounted to close the lower end of a forced feed plastic supply chamber 3 of extrusion apparatus of known general character, such as illustrated in FIGURE 1. The inner die-carrying member 1 is disc-like and is secured to a conical head 4 mounted on a shaft or tube 5 which extends through the supply chamber 3 and passes out through a tapering plug element 6 at the end remote from the dies. The plug element 6 has its peripheral surface recessed with a pair of diametrically oppositely disposed plastic distributing channels, of which one channel 6a is shown in FIGURE 1 and which meet at 6c opposite the plastic supply orifice 7 which receives plastic from a suitable source via the pressure worm 8. The channels, of which 6a is one, are divergent in the direction of the chamber 3 to disperse the plastic around the entry to the chamber. The shaft 5 passes through a thrust bearing 9 and is axially adjustably secured by nut 10 to locknut 10a. When motion is to be imparted to inner die member 1 the shaft is driven through a chain wheel 11 and chain 11a from any suitable power source or any other appropriate means may be provided to impart motion to said shaft.

The outer die-carrying member 2 is annular and is located around the inner die member 1, and is detachably mounted on a supporting member 12 which also serves as the outer walling of the lower part of the chamber 3. This member may be a fixture if it is intended that the outer die member 2 should permanently be stationary. When the outer die member 2 is to be revolved the supporting member 12 is mounted as shown in bearings carried by the outer two-part housing 13 of the apparatus. The housing 13 may be provided with electrical heating elements 13a and, in general, the apparatus may be supplied with heating means where required. The bearings for the member 12 are preferably of the tapered roller thrust type as shown at 12a in FIGURE 1. For the purpose of rotating the outer die member 2 and its support 12 a chain wheel drive 12b may be provided or rotation may be imparted by any other suitable drive means from a convenient power source.

The adjacent peripheral surfaces of the two die members 1 and 2 are accurately ground to provide slideway surfaces 14 in the zone A which guide and maintain the accurate relationship during motion of the dies carried by the members and in order to provide for the supply of plastic from the chamber 3 to the die means (described hereafter) of the die members 1 and 2, feed ducts 14a are cut in or through zone A, e.g. in the slideway surfaces 14. While the ground slideway surfaces may be cylindrical, they are preferably frusto-conical with the smaller end of the cone disposed towards the supply source, or alternatively, if desired the taper of the conical surfaces may be reversed so that the pressure in the chamber serves to maintain a close slideway junction.

Both die-carrying members may be detachably engaged with their mounting means, as indicated in FIGURE 1, in order that they may be replaced by other die members having a different arrangement or size of dies.

The above described apparatus may be used to produce (a) net or netting extruded as a continuous entity, (b) sheeting having projecting integral ribs or ribbing on one or both surfaces or (c) plain sheeting. To this end the die-carrying members 1 and 2 also essentially include, in addition to the ducted slideway 14 in zone A, an outer or lower zone, zone B, in which die means are formed or provided according to the product (a), (b) or (c) above required.

In the following description the various forms of die means will be described in the above order, but whenever possible and suitable, like references will be used throughout the three basic forms and the references to zones A and B, and zone C mentioned hereafter, will be maintained for all forms.

For the production of integrally extruded net or netting, the die means in zone B comprise, in each die member 1 and 2, a circumferentially extending series of spaced die orifices 15, served by open grooves 16 formed in the surfaces 17 of zone B, which surfaces are also in sliding contact, as are the surfaces 14 in zone A, to provide an additional slideway or bearing for the die members 1 and 2. As described in the aforementioned patent specification No. 836,555, the relative rotation between the die members 1 and 2, causes the die orifices 15 of each member to be moved into and out of opposite register, the effect being that when in register net intersections are extruded and when out of register net strands are extruded.

Between zone A and zone B of the die members 1 and 2 is a zone C wherein is located an annular groove or passageway 18 extending circumferentially around the opposed surfaces of the dies and serving as a reservoir or distribution zone for the plastic, intermediate zones A and B, and with which the feed ducts 14a in zone A and the die grooves 16 or die tubes 16a in zone B communicate. The feed ducts 14a may be in the form of grooves opening onto the slideway surface 14 (as shown) or they may be in the form of bores, pipes or tubes (as at 14b in FIGURES 8 and 14), traversing zone A in one or both die-carrying members, which bores, pipes or tubes communicate at one end with the feed chamber 3 while at the other end emerge into the annular reservoir 15. Similarly the die orifices 15 instead of being served by the open grooves 16 as shown in FIGURES 3 and 4, may be in the form of tubes or bores 16a (see FIGURES 3a and 3b) extending from a somewhat wider reservoir 18a and delivering plastic from the reservoir 18a to the die orifices 15. The die tubes or bores 16a may terminate in the die orifices 15 spaced from the slideway surfaces 17 of zone B as shown in FIGURE 3a or may terminate in the die orifices 15 located on the slideway surfaces 17 of zone B.

In zone C the reservoir 18 may be formed by an annular groove or passageway cut in both inner and outer die members 1 and 2 or in one die member only. In cross-section the reservoir 18 is preferably of larger cross-sectional area towards zone A and of diminishing area towards zone B as seen in FIGURE 3. This section may, however, be modified as, for example, in the case of the die bores 16a, FIGURE 3a. Where a groove is cut in both die members, the combined grooves form a passageway of pear-shape in cross-section, and the cross-sectional area of the annular reservoir 18 so formed, whether it be formed in one or both members, is such as to afford a capacity or intermediate store of plastic to keep the die orifices 15 in zone B fully supplied.

The feed ducts 14a in zone A and the die grooves 16 or bores 16a in zone B are staggered with respect to one another, that is to say, the grooves (or bores) in both zones A and B lie opposite the spaces between the grooves (or bores) of the other zone. By this arrangement, there is no direct communication or flow through the feed ducts 14a to the die grooves 16 (or bores 16a) and the plastic receives treatment in the annular reservoir 18 before entering the die grooves 16 (or bores 16a) that is to say, owing to the relative rotation of the die members 1 and 2 the plastic in the reservoir 18 is turned over or caused to circulate with a turbulent mixing action so that any irregularities in consistency are smoothed or smeared out before the plastic is forced through the die grooves 16 or bores 16a.

The number and cross section of the feed ducts 14a in zone A may be varied but in all cases the sum of the cross sectional areas of the ducts 14a is the same or somewhat greater than the sum of the cross sectional area of the die grooves 16 or bores 16a.

Since the mutually contacting surfaces of the slideway 14 of the die members 1 and 2 in zone A bear on one another to maintain the die members co-axial, it is important to arrange that the feed ducts 14a through the slideway 14 in zone A do not cause "meshing" of the die members where the ducts 14a are in the form of open grooves. To this end the feed ducts 14a may be (a) oppositely inclined, (b) dimensioned so that the slideway surface between adjacent feed ducts is of greater arcuate extent than the width of the grooves forming the feed ducts, i.e. the "lands" between the grooves are wider than the grooves, or (c) the number of feed ducts in one die member in relation to the number of feed ducts in the other die member is such that, around the slideways 14, there are always one or more "land" portions of the slideway in contact to maintain co-axiality of the die members.

It has been described above that the feed ducts in zone A and the extrusion dies in zone B may be in the form of open grooves or in the form of tubes, pipes or bores, it is to be understood however, that the feed ducts and the extrusion dies may be combinations of these forms, e.g. the feed ducts may both be in the form of tubes, pipes or bores and the extrusion dies may be in one die member in the form of open grooves and in the other die member in the form of tubes, pipes or bores.

The term "plastic" is used herein in the same sense as defined in the above mentioned patent specification No. 836,555, and although each die-carrying member will usually have a number, and sometimes a considerable number of dies, the term "sets of dies" is intended to include a single die in one or other member and a number of dies in the other member, while for certain products, such for examples as healds, a single die in each member may be employed.

While not illustrated, as the net is extruded, it may be drawn over a former cylinder located in a tank containing setting or fixing liquid in which are located draw or hauling-down rolls which pass the net on to reeling or other collecting means. Alternatively, the former may be surrounded by a two-part cylindrical setting liquid-containing cup or bottle, the parts of which are hinged together and have a sponge rubber seal at the lower end between which and the former the net is drawn. According to another alternative, the plastic net on emerging from the dies may be fixed by spraying with a cooling or treating liquid or by blowing with cooling air.

When it is desired to subject the finished net to molecular orientation in a manner known for monofilaments, it is passed between holding and draw rolls revolving at differential speeds according to the amount of draught it is desired to apply to lengthen the mesh strands of the net without substantially affecting the net intersections.

For the production of extruded sheeting having integral projecting ribs on one or both surfaces thereof, the arrangement is generally as described above for the production of netting except that the form of the die means in zone B is modified, see FIGURES 5, 6, 6a, 6b, 7 and 8.

The annular reservoir 18 (or 18a see FIGURES 6a and 6b) is supplied by feed ducts 14a (in the form of grooves in the slideway surfaces 14) or feed pipes or bores 14b, see FIGURE 8 and the function and behaviour of the feed ducts or bores and the annular reservoir are as already described.

The die means in zone B for extruding ribbed sheeting include an annular die slot 19 for extrusion of the sheeting component of the extrudate, and in order to provide for the formation of ribs, on one or both sides of the sheeting formed by the annular die slot 19, ribbing dies 20 are formed in one or both of the surfaces of the die slot 19, i.e. as shown in FIGURES 6, 7 and 8. As an alternative the ribbing dies may take the form of ribbing die tubes or pipes 20a, see FIGURES 6a and 6b which terminate in die orifices 21 either spaced from the die slot 19 as shown in FIGURE 6a or cutting the die slot as shown in FIGURE 6b. In manufacturing the die-carrying members it is convenient to make the whole periphery accurately ground with frusto-conical complementary surfaces and then to produce the sheeting die slot 19 by grinding back either one or both of the peripheral surfaces radially commensurate in width with the gauge of the sheeting to be produced. Thus the sheeting die slot 19 may be formed so as to locate the slot 19 as a recess or rebate in the inner die member 1 with the opposite side of said slot constituted by a continuation of the plane of the slideway surface 14 (zone A) on the member 2, or the recess or rebate may be located in the outer die member 2 with the opposite side or walling of the slot constituted by a continuation of the plane of the slideway surface 14 (zone A) of the inner member 1. According to a third alternative, which is as illustrated, the die slot 19 is formed by a recess or rebate in both on the inner member 1 and on the outer member 2 with the plane of the slideway surface 14 lying intermediate the rebate wall surfaces.

The radial clearance between the walls of the die slot 19 in zone B may be varied according to the thickness of the sheeting to be extruded, and similarly the cross sectional shape of the ribbing dies 20 (or 20a or 20b) associated with the slot 19 may be varied to suit the cross section predetermined for the ribs.

If the ribs are to be otherwise than solely decorative and are to be formed on one side only of the sheeting as by extrusion through ribbing dies 20 (or 20a or 20b) in one of the die members only, the rate of relative movement between the die members must be adjusted in relation to the rate of extrusion such that the ribs are extruded on a slow pitch helix, otherwise the ribs might be liable to promote tearing along the lines of the ribs. Consequently, it is preferred for all purposes to provide ribbing dies 20 (or 20a or 20b) on both sides of the sheeting slot 19 so that the ribs are extruded integral with the sheeting in crossing relationship on opposite sides thereof, which arrangement tends to check tearing and forms a sort of network reinforcement of the sheeting.

Ribbed sheeting during production may be ballooned in known manner by introducing air or gas under suitable pressure through the inner die member 1 as by providing the shafting 5 on which the die member 1 is mounted with a central bore or ducting 5a through which air or gas is passed into the tube or cylinder as it is extruded.

When the apparatus is to be used for extruding piping or hosing having relatively small bore and thick walls (i.e. sheet), little or no air or gas pressure is used and the shafting 5 supporting the inner die member 1 need not be hollow or ducted for air or gas.

For the production of extruded plain sheeting, the arrangement is generally as described above, particularly in respect of the foregoing description of the production of ribbed sheeting except that no ribbing dies are provided in association with the annular sheeting die slot in zone B of the die members 1 and 2, see FIGURES 9 to 14.

The plain sheeting extrusion slot 19a may be formed in the same manner as described above for the sheeting die slot 19 used for the production of ribbed sheeting.

The feed ducts 14a or 14b (the latter, see FIGURE 14) associated with the slideway 14 of zone A of the die members 1 and 2 are as already described.

The annular reservoir 18, see FIGURES 10 and 11, is as described above, but FIGURES 12, 13 and 14 show modified reservoir forms 18b, and 18c in which the reservoir has greater axial extent so that zone C is enlarged axially and zone B is greatly reduced, the sheeting slot 19b having a minimum axial extent and virtually comprises only an annular sheeting extrusion orifice. In other words zones B and C are, in effect, merged.

In the form shown in FIGURE 12, the reservoir 18b (i..e the composite zones B and C) is defined by oppositely facing concave walls 22 on the inner and outer die members 1 and 2, terminating at the annular extrusion slot 19b. In the form shown in FIGURES 13 and 14 the walls 23 of the reservoir 18c (i.e. the composite zones B and C) are straight in section and approach one another more or less uniformly towards and terminating in the extrusion slot 19b.

In order to improve the frictional effect on the plastic in the reservoir 18b or 18c (i.e. composite zones B and C) to enhance the mixing and smearing action, the walls 22 or 23 of the reservoir may be scratched, granulated or otherwise roughened, but not to an extent to produce corresponding ribbing or roughening of the plain sheeting extruded through the die slot 19b.

I claim:
1. In apparatus for extruding plastic netting or sheeting in tubular form comprising, in combination, coaxial, circular, relatively rotating die members having circumferentially disposed die discharge orifices at one end thereof, and coaxial surfaces in sliding contact with one another to form a bearing slideway extending from said die orifices to the opposite end of said die members, and axially extending feed ducts formed in said die members adapted for the passage of plastic under pressure from a supply chamber to said die orifices; the improvement which comprises the provision of an annular passage formed in said slideway adjacent said die orifices at right angles to the axis of said die members and in communication with said feed ducts, said passage serving as an intermediate annular reservoir for the plastic fed through the feed ducts from the supply chamber, and by reason of the friction of the walls of the annular passage through rotation of the die members the plastic in said reservoir is kept in circulating, turbulent smearing motion, said feed ducts to one side of said annular passage being out of alignment with said die orifices on the other side of said annular passage whereby to prevent a straight throughway of plastic from the supply chamber to said die orifices.

2. Apparatus according to claim 1 wherein the circumferentially disposed die orifices are formed in each die member and are arranged so that when the die orifices in one die member are in opposite register with the orifices in the other die member net intersections are produced and when the die orifices are out of register net strands are produced.

3. Apparatus according to claim 2, wherein the die orifices in each die member are supplied with plastic from the annular reservoir passage by passages extending from the annular reservoir passage or groove, through the die members, to the die orifices.

4. Apparatus according to claim 1, wherein the circumferentially disposed die means comprise an annular sheeting extrusion slot located between the die members and a circumferentially extending series of spaced die orifices in one or both of the die members located in respect to the sheeting extrusion slot so that the extruded sheet is formed with integral ribs thereon, the ribs being extruded through the die orifices.

5. Apparatus according to claim 1 wherein the feed ducts in each die member are in the form of open grooves on the slideway surfaces of the die members, and are oppositely inclined with respect to the feed ducts in the other die member to prevent interlocking or meshing between the slideway surfaces.

6. Apparatus according to claim 1 wherein the feed ducts in each die member are in the form of open grooves on the slideway surfaces, and are so dimensioned that the width of each groove is less than the slideway surface or land between adjacent grooves so that interlocking or meshing between the slideway surfaces is prevented.

7. Apparatus according to claim 1 wherein the feed ducts in the die members are in the form of open grooves on the slideway surfaces, and are arranged so that the number and spacing of the feed ducts in one die member differs from the number and spacing of the feed ducts in the other die member whereby, around the slideway surfaces, there are always one or more portions of slideway surface of each die member in contact to maintain co-axiality of the die members and to prevent interlocking or meshing between the slideway surfaces.

References Cited in the file of this patent

UNITED STATES PATENTS

| | | |
|---|---|---|
| 2,013,688 | Kinsella | Sept. 10, 1935 |
| 2,517,711 | Pool et al. | Aug. 8, 1950 |
| 2,589,870 | Sale et al. | Mar. 18, 1952 |
| 2,919,467 | Mercer | Jan. 5, 1960 |
| 2,923,970 | Genovese | Feb. 9, 1960 |